(12) United States Patent
Carpenter et al.

(10) Patent No.: US 11,467,912 B2
(45) Date of Patent: Oct. 11, 2022

(54) FEATURE TOGGLE MANAGEMENT WITH APPLICATION BEHAVIOR POINT-IN-TIME RESTORATION USING EVENT SOURCING

(71) Applicant: Dell Products L.P., Round Rock, TX (US)

(72) Inventors: Donal Carpenter, Wicklow (IE); Stephen Dunne, Dublin (IE); Arun Muthukumar, Plainsboro, NJ (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/077,466

(22) Filed: Oct. 22, 2020

(65) Prior Publication Data
US 2022/0129351 A1 Apr. 28, 2022

(51) Int. Cl.
*G06F 11/14* (2006.01)
*G06F 11/07* (2006.01)

(52) U.S. Cl.
CPC ...... *G06F 11/1438* (2013.01); *G06F 11/0757* (2013.01); *G06F 11/0772* (2013.01); *G06F 11/1471* (2013.01); *G06F 2201/84* (2013.01)

(58) Field of Classification Search
CPC .............. G06F 11/1438; G06F 11/0757; G06F 11/1471; G06F 11/0772; G06F 2201/84
See application file for complete search history.

(56) References Cited

U.S. PATENT DOCUMENTS

| | | | |
|---|---|---|---|
| 10,509,716 B2 * | 12/2019 | Ramalingam | G06F 8/71 |
| 2017/0139782 A1 * | 5/2017 | Chen | G06F 11/1438 |
| 2018/0121045 A1 | 5/2018 | Mizrahi et al. | |
| 2018/0337794 A1 * | 11/2018 | Casaletto | H04L 43/10 |
| 2019/0097825 A1 * | 3/2019 | Kan | G06F 16/951 |
| 2019/0227876 A1 * | 7/2019 | Dardis | G06F 11/1433 |
| 2019/0324767 A1 * | 10/2019 | Stein | G06F 8/71 |
| 2020/0104773 A1 * | 4/2020 | Pechacek | G06Q 10/101 |

OTHER PUBLICATIONS

Kim Harrison, "The Only Constant in Modern Infrastructure, is Change", Nov. 18, 2017, https://launchdarkly.com/blog/the-only-constant-in-modern-infrastructure-is-change/ (Year: 2017).*
https://launchdarkly.com/.

* cited by examiner

*Primary Examiner* — Bryce P Bonzo
*Assistant Examiner* — Michael Xu
(74) *Attorney, Agent, or Firm* — Ryan, Mason & Lewis, LLP (57) ABSTRACT

Techniques are provided for feature toggle management with application behavior point-in-time restoration using event sourcing. One method comprises maintaining feature toggle events for features of an application, wherein each feature toggle event comprises an indication of an event time of the respective feature toggle event for a given feature; receiving a request to execute the application with feature toggle settings associated with an indicated point-in-time; and initiating an execution of the application with the feature toggle settings associated with the indicated point-in-time by processing the feature toggle events having an event time up to the indicated point-in-time. Event sourcing techniques may be employed to store the plurality of feature toggle events for the plurality of features in an event repository. The application may consume the feature toggle events having an event time up to the indicated point-in-time and may ignore the feature toggle events having an event time after the indicated point-in-time.

20 Claims, 10 Drawing Sheets

FEATURE TOGGLE MANAGEMENT WITH APPLICATION BEHAVIOR POINT-IN-TIME RESTORATION USING EVENT SOURCING

FIELD

The field relates generally to information processing techniques and more particularly, to the management of applications.

BACKGROUND

Software applications are increasingly deployed as a collection of microservices. In addition, a number of software providers are increasingly using feature toggles whereby features of an application may be selectively toggled between permitted feature states (e.g., enabled, disabled, or hidden states). When feature toggles are combined with continuous deployment practices, for example, where new code can be deployed frequently, it can become difficult to understand how an application was behaving at a specific point-in-time.

A need exists for improved techniques for analyzing behavior of an application at a specific point-in-time.

SUMMARY

In one embodiment, a method comprises maintaining a plurality of feature toggle events for a plurality of features of an application, wherein each feature toggle event comprises an indication of an event time of the respective feature toggle event for a given feature; receiving a request to execute the application with feature toggle settings associated with an indicated point-in-time; and initiating an execution of the application with the feature toggle settings associated with the indicated point-in-time by processing the feature toggle events having an event time up to the indicated point-in-time.

In some embodiments, event sourcing techniques are employed to store the plurality of feature toggle events for the plurality of features in an event repository. The application may consume the feature toggle events having an event time up to the indicated point-in-time to restore the application with the feature toggle settings for the indicated point-in-time and may ignore the feature toggle events having an event time after the indicated point-in-time.

Other illustrative embodiments include, without limitation, apparatus, systems, methods and computer program products comprising processor-readable storage media.

BRIEF DESCRIPTION OF THE DRAWINGS

FIGS. 6A and 6B are flow charts illustrating processes for a consuming application and a consumer component for feature toggle management in a normal operating mode and a troubleshooting mode, respectively, according to an embodiment of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for feature toggle management with application behavior point-in-time restoration using event sourcing. As used herein, an application behavior comprises a status of one or more enabled and/or configured application features.

In one or more embodiments, feature toggles are implemented in an application using event sourcing techniques to create and push updates to a status of each feature toggle as events. The feature toggle events are written to a log or repository, where they may be permanently persisted as events or messages in the order in which they were recorded. The feature toggle events may comprise, for example, several discrete events such as feature toggle created, feature toggle changed and feature toggle deleted.

When a given application starts up, the application can consume and replay the feature toggle events from the repository to reconstitute the current status of all feature toggle settings. In some embodiments, an in-memory key-value representation of the latest status for each feature toggle may be employed. The in-memory key-value representation may be interrogated by the application code to determine the state of any individual feature toggle. When the toggle status value is maintained in memory within the application domain, in some embodiments, a call to determine the value for a flag is high performing, with little, if any, cross-process or machine boundary overhead. In addition, the disclosed event sourced repository acts as messaging middleware; thereby efficiently pushing out all new feature toggle events to the listening application instances.

One or more aspects of the disclosure recognize that one gap with feature toggling is understanding the state or behavior of an application at an indicated moment in time. It is often difficult to perform a targeted historical regression based on customer interactions, for example, unless the behavior of the application at the indicated moment in time is known. Most feature toggle applications include an audit trail; for any reasonably complex system, however, it is nearly impossible to rationalize how every toggle may have affected the execution of an application request or command at a given point-in-time.

Typically, feature toggles are implemented using a management user interface, where feature toggles can be created, updated and deleted. Features may be wrapped by developers with an "if" condition that checks the value of the corresponding feature toggle. An application programming interface (API) can control access to the feature toggle persistence medium and expose the API endpoints for create, read, update, and delete (CRUD) functionality, which may be deployed, for example, to a cloud hosted application. Application instances will then stream new feature toggle updates and keep an in-memory representation of the current state of each feature toggle.

The practice of feature toggling can add complexity to troubleshooting issues in production applications, making targeted historical regression difficult. For example, the exact status of all feature toggles in a complete eco-system may not be known at a specific point-in-time. Even if audit logs were evaluated to extract the values of all feature toggles, it would be an arduous task to manually read through the entire execution flow across microservice boundaries. It would be a wasteful and time-consuming process to set up a new environment and feature toggle application instance and then configure the feature toggle application instance with the feature toggle values extracted from the audit logs.

Figure 1:
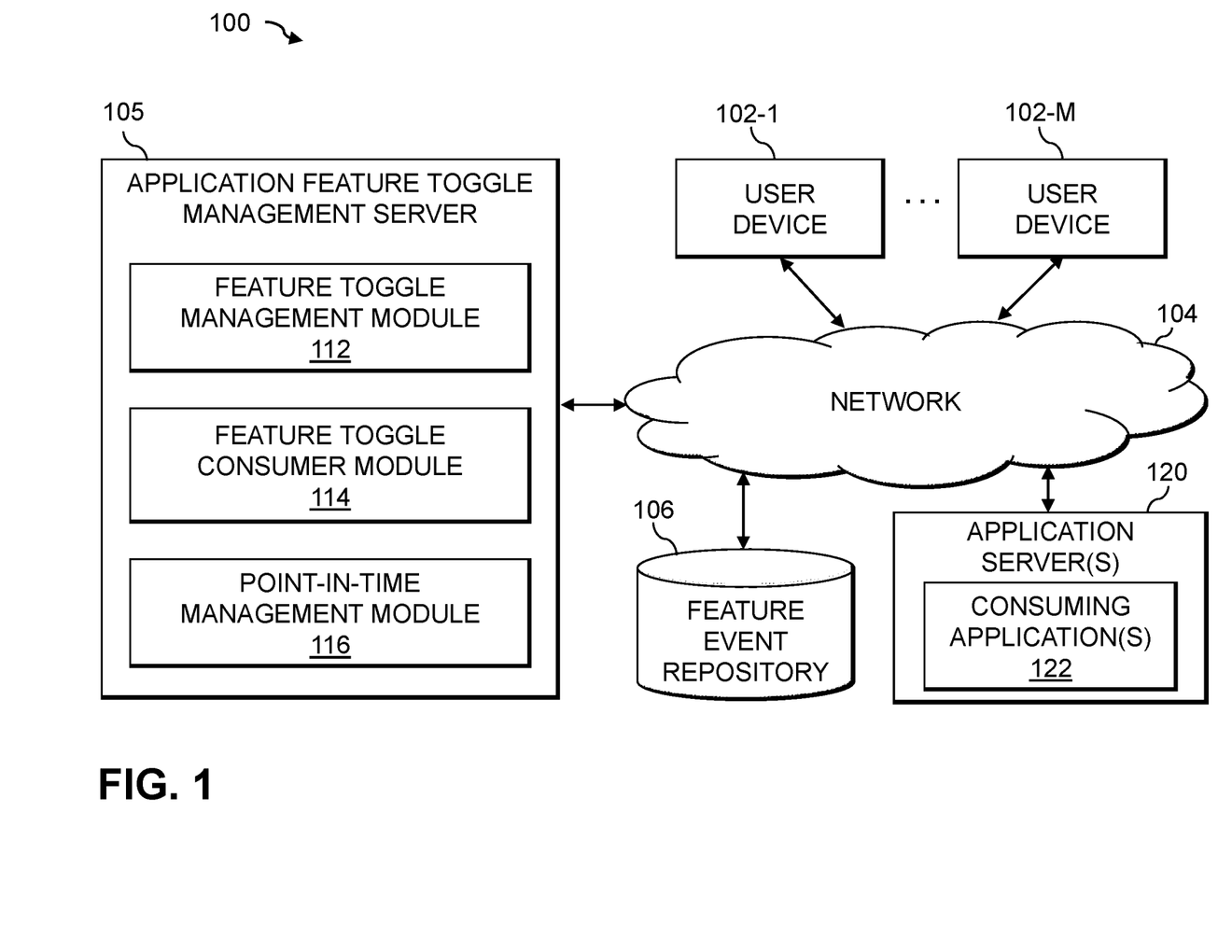
FIG. 1 illustrates an information processing system configured for feature toggle management with application behavior point-in-time restoration using event sourcing in accordance with an illustrative embodiment.

FIG. 1 shows a computer network (also referred to herein as an information processing system) 100 configured in accordance with an illustrative embodiment. The computer network 100 comprises a plurality of user devices 102-1 through 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is application feature toggle management server 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers." The user devices 102 may comprise a network client that includes networking capabilities such as ethernet, Wi-Fi, etc.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the application feature toggle management server 105 can have an associated feature event repository 106 configured to store feature events pertaining to the status of one or more feature toggles of one or more applications.

The feature event repository 106 in the present embodiment is implemented using one or more storage systems associated with the application feature toggle management server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the application feature toggle management server 105 can be one or more input-output devices, which illustratively comprise keyboards, displays or other types of input-output devices in any combination. Such input-output devices can be used, for example, to support one or more user interfaces to the application feature toggle management server 105, as well as to support communication between the application feature toggle management server 105 and other related systems and devices not explicitly shown.

The user devices 102 and the application feature toggle management server 105 in the FIG. 1 embodiment are assumed to be implemented using at least one processing device. Each such processing device generally comprises at least one processor and an associated memory, and implements one or more functional modules for controlling certain features of the application feature toggle management server 105.

More particularly, user devices 102 and application feature toggle management server 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the user devices 102 and/or the application feature toggle management server 105 to communicate over the network 104 with each other (as well as one or more other networked devices), and illustratively comprises one or more conventional transceivers.

As also depicted in FIG. 1, the application feature toggle management server 105 further comprises a feature toggle management module 112, a feature toggle consume module 114, and a point-in-time management module 116.

It is to be appreciated that this particular arrangement of modules 112, 114 and 116 illustrated in the application feature toggle management server 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor. An exemplary process utilizing modules 112, 114 and 116 of an example application feature toggle management server 105 in computer network 100 will be described in more detail with reference to the flow diagram of, for example, FIGS. 5, 6A, 6B and 7.

As also depicted in FIG. 1, the information processing system 100 further comprises one or more application servers 120 that host one or more consuming applications 122, as discussed further below in conjunction with, for example, FIG. 3.

It is to be understood that the particular set of elements shown in FIG. 1 for feature toggle management with application behavior point-in-time restoration using event sourcing is presented by way of illustrative example only, and in other embodiments additional or alternative elements may be used. Thus, another embodiment includes additional or alternative systems, devices and other network entities, as well as different arrangements of modules and other components.

Figure 2:
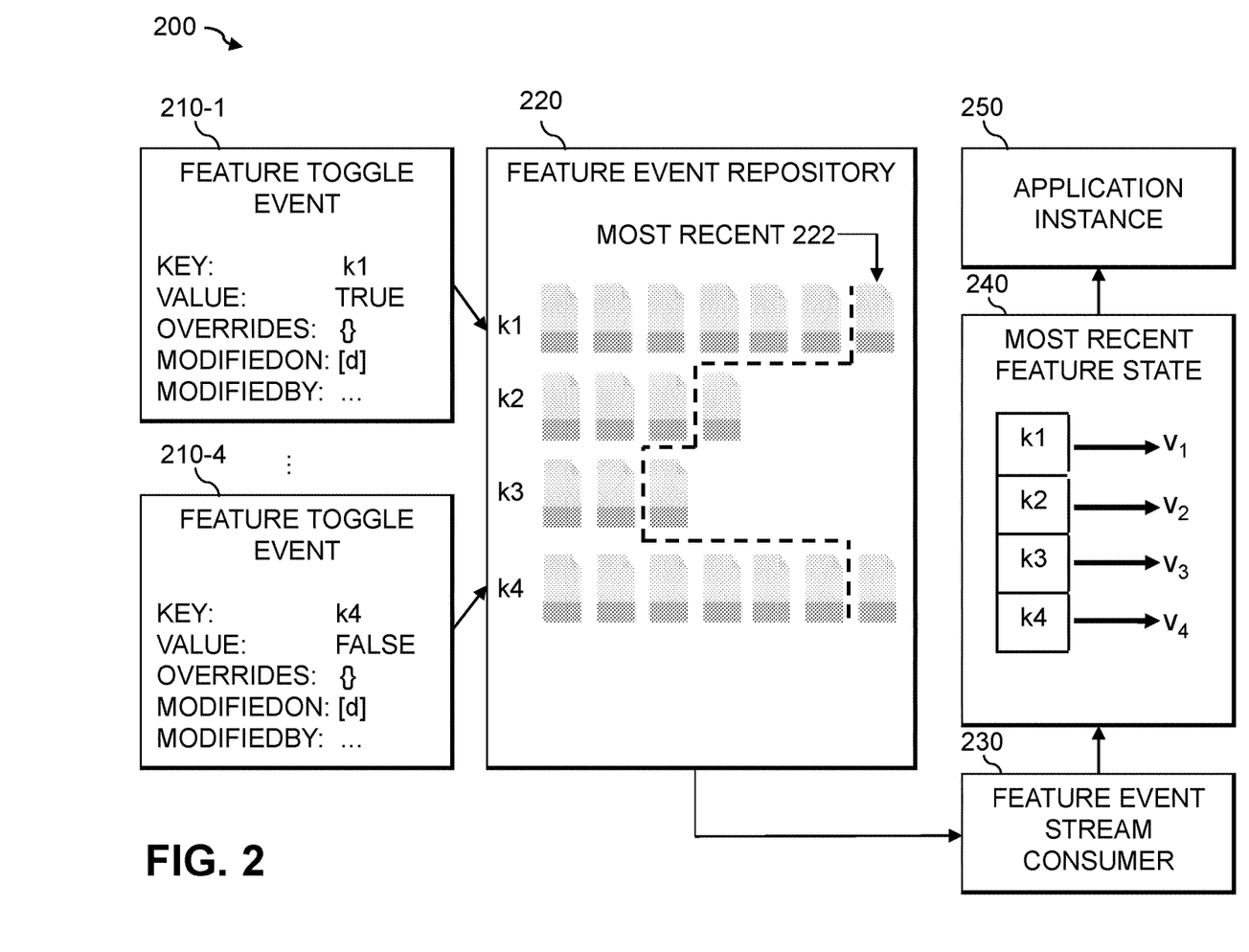
FIG. 2 illustrates an exemplary feature toggle management environment that restores application behavior to an indicated point-in-time using event sourcing, according to an embodiment of the disclosure.

FIG. 2 illustrates an exemplary feature toggle management environment 200 that restores application behavior to an indicated point-in-time using event sourcing, according to an embodiment of the disclosure. As shown in FIG. 2, the exemplary feature toggle management environment 200 processes a plurality of feature toggle events 210-1 through 210-4, each corresponding to a different feature toggle of an application. In the example of FIG. 2, four feature toggles are shown. The exemplary feature toggle event 210-1 corresponds to a feature toggle having a key of kl and the value for the kl feature toggle is set to "true" (or enabled). Feature toggles can be more complex than simply being on or off, and may include overrides for certain customer segments or other contextual conditions, as shown by the exemplary feature toggle events 210.

In addition, the exemplary feature toggle events 210 indicate a time when the given feature toggle event 210 was modified in the "modified on" entry, and an identifier of the person the entered the modification in the "modified by" entry.

The exemplary feature toggle events 210 are stored in a feature event repository 220, in time order, separately for each different feature toggle (or key). The most recent feature toggle event 222 in the feature event repository 220 is shown on the right side of the feature event repository 220, to the right of a dashed line.

The exemplary feature toggle events 210 from the feature event repository 220 are processed by a feature event stream consumer 230, as discussed further below in conjunction with FIG. 3. Generally, the feature event stream consumer 230 identifies the most recent feature state for each feature toggle for storage in a most recent feature state 240. For each feature toggle, identified by a corresponding key, the in-memory most recent feature state 240 records the value of the most recent feature toggle event 210 for each feature toggle.

The most recent feature toggle event 210 for each feature toggle, from the in-memory most recent feature state 240 can be provided to one or more application instances 250, as discussed further below in conjunction with FIG. 3.

Figure 3:
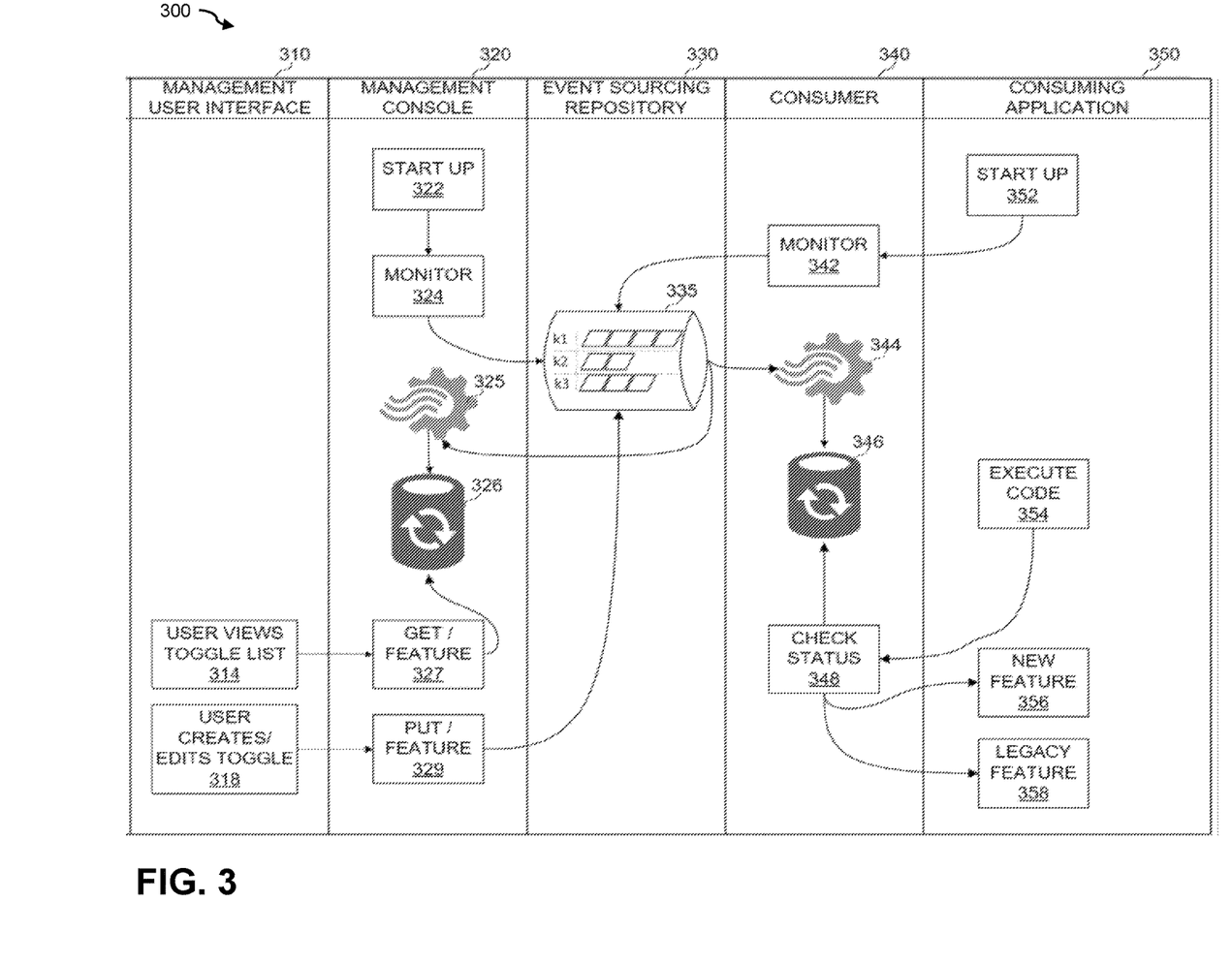
FIG. 3 is a flow diagram illustrating a sequence of interactions for feature toggle management that provides application behavior point-in-time restoration using event sourcing, according to one or more embodiments.

FIG. 3 is a flow diagram 300 illustrating a sequence of interactions for feature toggle management that provides application behavior point-in-time restoration using event sourcing, according to one or more embodiments. As shown in FIG. 3, a user can employ a management user interface 310 to view a toggle list 314 and/or to create, update and remove a feature toggle status 318. The management user interface 310 interfaces with a management console 320.

When the management console 320 starts up 322, the management console 320 will monitor 324 a feature event repository 335 within an event sourcing repository 330, in a similar manner as the feature event repository 220 of FIG. 2.

In some embodiments, the feature event repository 335 comprises a historical log of feature toggle events and should be able to keep a record of all messages in a log. Event messages for any given feature toggle key/identifier should be read in the order that they were persisted. The feature event repository 335 should be scalable and performant for reading and writing feature toggle messages. In addition, the feature event repository 335 should be able to push (e.g., "event out") new feature toggle messages to all connected application instances 250.

The feature event repository 335 may be implemented, for example, using the Kafka open source stream processing software platform developed by the Apache Software Foundation.

The feature events from the feature event repository 335 are streamed and consumed by a feature event stream consumer 325, in a similar manner as FIG. 2, for storage in an in-memory key/value map 326.

In addition, a user request to view a toggle list 314 is processed by the management console 320 as a get feature command 327 to obtain the feature toggle list from the in-memory key/value map 326.

A user request to create, update and remove a feature toggle status 318 is processed by the management console 320 as a put feature command 329 to store the feature status update in the feature event repository 335.

On the application side, a consuming application 350 starts up 352 and a consumer 340 monitors 342 the feature event repository 335 for feature toggle status updates. Generally, the consumer 340 is responsible for interpreting the incoming stream of feature toggle events. In a thread safe way, in some embodiments, the consumer 340 builds a dictionary or map of each feature toggle and its respective status. The consumer 340 can be packaged up so feature teams can embed the consumer 340 into their applications (for example, in a package management ecosystem such as Nuget, Gem, Pip, Maven or Gradle for different programming languages).

When the application starts up 352, the consumer 340 will request all the feature toggle messages from the feature event repository 335 and read through the feature toggle messages, updating its own internal state with the correct feature toggle values (typically, in a manner of milliseconds).

The consumer 340 also has the important role of consuming new feature toggle messages and updating its internal state with the correct values for all feature toggles. The consumer 340 of each application instance 250 maintains an open network connection with the feature event repository 335 throughout the lifecycle of the application to ensure efficiency.

The consumer 340 has a "client" component that the application code 354 can query, passing a feature toggle key to retrieve the status. The consumer 340 checks the status at step 348 in an internal in-memory feature toggle key/value map 346, and provides an indication to the consuming application 350 of whether the queried feature is a new feature 356 or a legacy feature 358.

The internal in-memory feature toggle key/value map 346 is maintained by a feature event stream consumer 344 that consumes the streamed feature events from the feature event repository 335, in a similar manner as the feature event stream consumer 325. In some embodiments, a flag is passed to the feature event stream consumer 344 instructing the feature event stream consumer 344 to only consume feature toggle update events up to a specific point-in-time. This can be set, for example, as a command line argument or an environment variable, or in a configuration setting. When present, the consumer 340 will ignore all feature toggle messages after this indicated point-in-time; thereby returning the behavior of the consuming application 350 to that set of feature toggle settings for the purpose of understanding or troubleshooting an important issue.

While one or more embodiments of the disclosure employ event sourceing to implement the disclosed techniques for feature toggle management with application behavior point-in-time restoration, other embodiments can employ different arrangements, including arrangements that do not employ event sourcing, as would be apparent to a person of ordinary skill in the art, based on the present disclosure.

Figure 4:
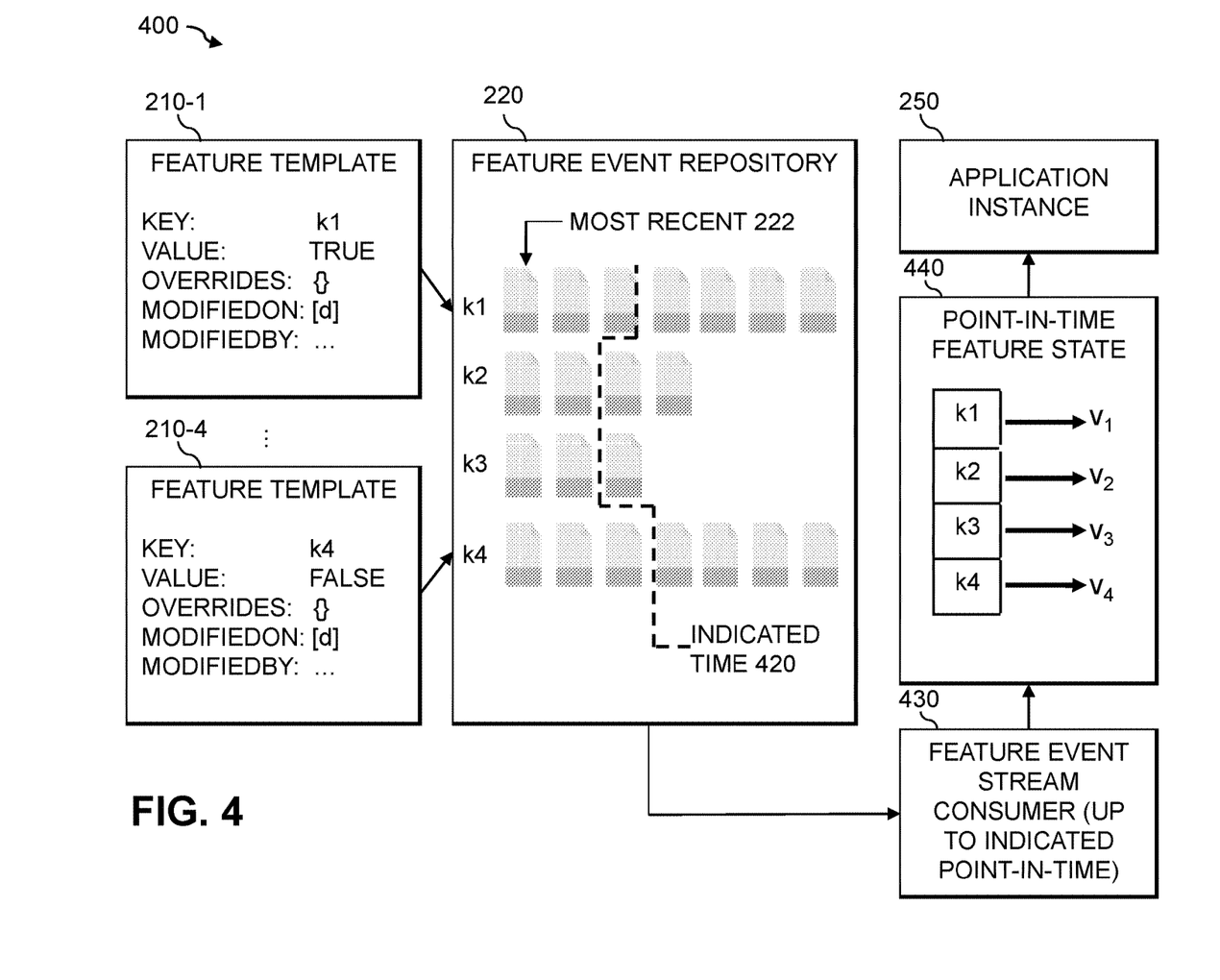
FIG. 4 illustrates an exemplary feature toggle management environment configured to restore application behavior to an indicated point-in-time using event sourcing, according to some embodiments of the disclosure.

FIG. 4 illustrates an exemplary feature toggle management environment 400 configured to restore application behavior to an indicated point-in-time 420 using event sourcing, according to some embodiments. The exemplary feature toggle management environment 400 comprises feature toggle events 210, feature event repository 220 and an application instance 250, that operate in a similar manner as FIG. 2.

In addition, the exemplary feature toggle management environment 400 restores the behavior (e.g., the settings of each feature toggle) of the application instance 250 to the setting of the indicated point-in-time 420. As noted above, the exemplary feature toggle events 210 indicate a time when the given feature toggle event 210 was modified in the "modified on" entry and are stored in a feature event repository 220, in time order, separately for each different feature toggle (or key).

FIG. 4 illustrates the indicated point-in-time 420 in the feature event repository 220 using a dashed line. The exemplary feature toggle events 210 from the feature event repository 220 are processed by a feature event stream consumer 430. Generally, the feature event stream consumer 430 processes the feature toggle events 210 having an event time up to the indicated point-in-time 420 (e.g., those feature toggle events 210 to the left of the dashed line in the feature event repository 220 of FIG. 4).

The exemplary feature event stream consumer 430 stores the latest feature state before the indicated point-in-time 420 in an in-memory point-in-time feature state 440. For each feature toggle, identified by a corresponding key, the in-memory point-in-time feature state 440 records the value of the latest feature toggle event 210 that occurred for each feature toggle before the indicated point-in-time 420.

The point-in-time feature state 440 for each feature toggle, from the point-in-time feature state 440 can be provided to one or more application instances 250.

Figure 5:
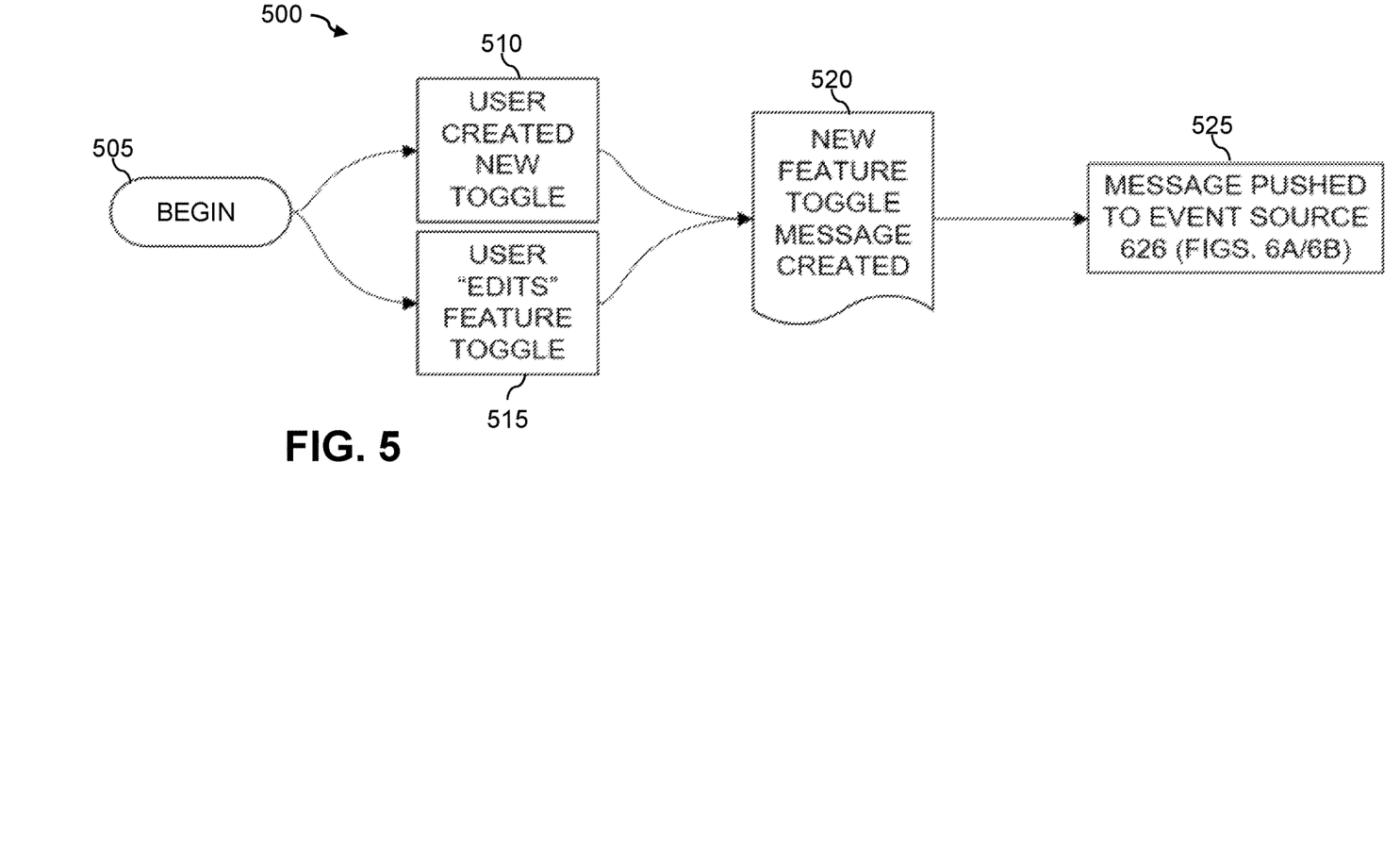
FIG. 5 is a flow chart illustrating a management console process for feature toggle management, according to one embodiment of the disclosure.

FIG. 5 is a flow chart illustrating a management console process 500 for feature toggle management, according to one embodiment of the disclosure. As shown in FIG. 5, the management console process 500 starts at step 505, when a user creates a new feature toggle during step 510, or when a user edits an existing feature toggle during step 515. The management console process 500 creates a new feature toggle message for the event during step 520 and the message is pushed during step 525 to an event source 626, as discussed further below in conjunction with FIGS. 6A and 6B.

FIG. 6A is a flow chart illustrating processes for a consuming application 600 and a consumer component 620 for feature toggle management in a normal operating mode, according to an embodiment. As shown in FIG. 6A, the consuming application 600 is started in step 602 when the application starts during step 603 and the consumer component 620 is initialized in step 622. The consumer component 620 connects to the event source 626 (as discussed above in conjunction with FIG. 5) during step 624. The consumer component 620 waits for a feature toggle message from the event source 626 during step 628. When a feature toggle message is detected from the event source 626 during step 630, a test is performed during step 632 to determine if the key associated with the feature toggle message is known. If the key is known, the corresponding feature toggle is updated during step 636 with the newer value(s). If the key is not known, the new feature toggle is added to the in-memory key/value store 638 during step 634. Thereafter, the consumer component 620 continues to process new feature toggle messages from the event source 626 during step 640.

The consuming application 600 checks the feature status during step 604 using an internal consumer API 645 of the consumer component 620. The feature status is provided by the internal consumer API 645 (after obtaining the feature status from the in-memory key/value store 638) to the consuming application 600 and a test is performed during step 606 to determine if a given feature status is enabled.

If the given feature status is enabled, then the new feature is executed during step 608. If the given feature status is not enabled, then a legacy feature is executed during step 610.

Figure 6B:
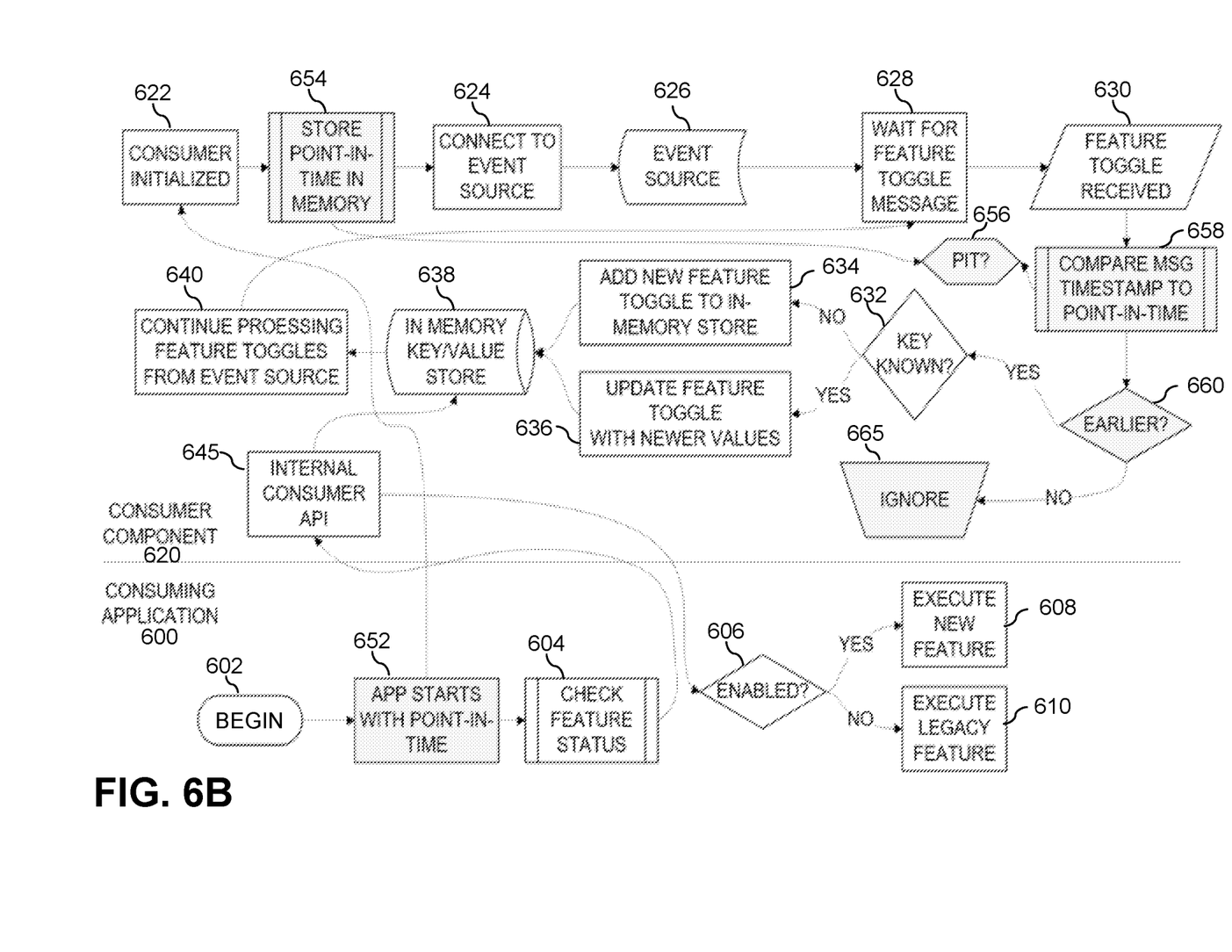

FIG. 6B is a flow chart illustrating processes for the consuming application 600 and the consumer component 620 of FIG. 6B for feature toggle management in a troubleshooting mode, according to one or more embodiments. The steps shown in FIG. 6B with corresponding steps in FIG. 6A operate in a similar manner as FIG. 6A.

As shown in FIG. 6B, the consuming application 600 is started in step 602 when the application is started during step 652 with an indicated point-in-time. The consumer component 620 is then initialized in step 622 and the indicated point-in-time ("PIT") is stored in memory 656 during step

654. When a feature toggle message is detected from the event source 626 during step 630, the message timestamp is compared during step 658 to the point-in-time from the memory 656. A test is performed during step 660 to determine if the message timestamp is earlier than the indicated point-in-time.

If the message timestamp is earlier than the indicated point-in-time during step 660, then a further test is performed to process the feature toggle message in step 632, as discussed above in conjunction with FIG. 6A. If the message timestamp is not earlier than the indicated point-in-time during step 660, then the feature toggle message is ignored during step 665.

Figure 7:
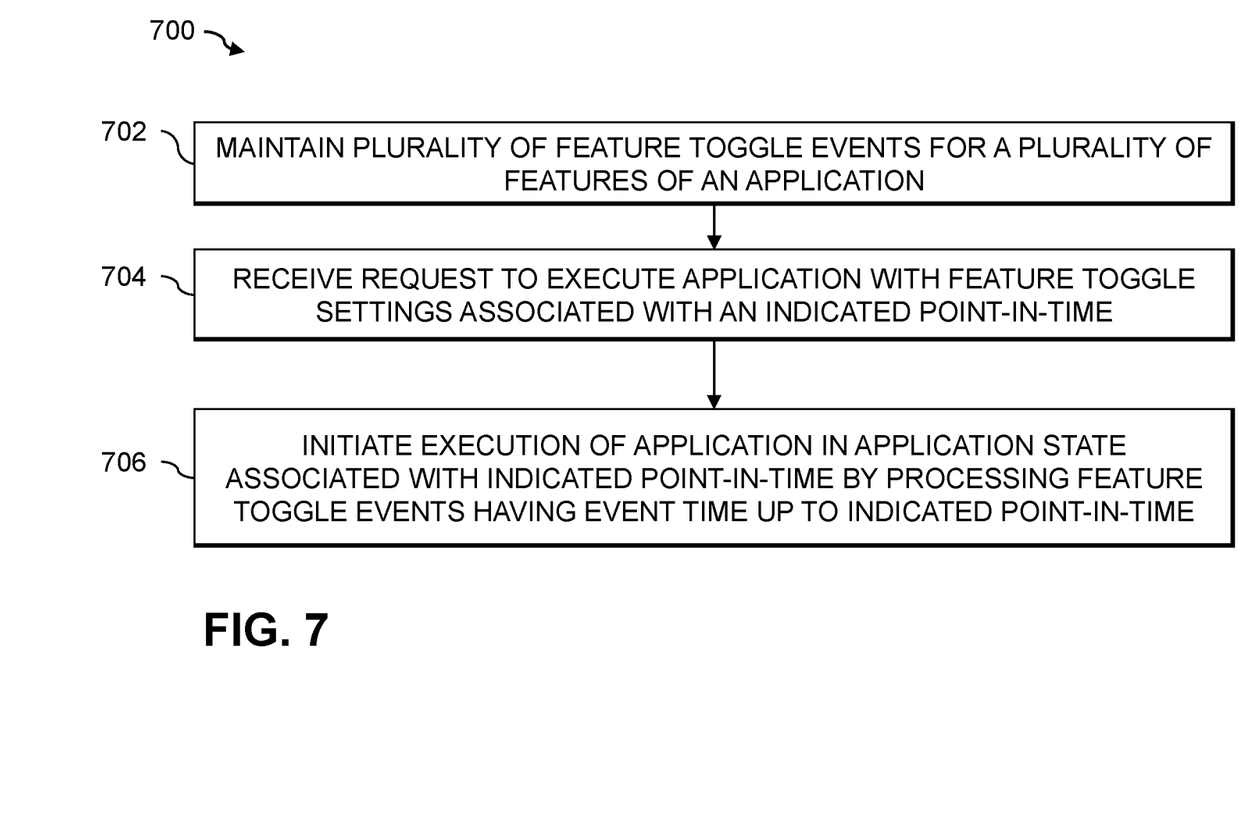
FIG. 7 is a flow chart illustrating an exemplary implementation of a feature toggle management process with application behavior point-in-time restoration using event sourcing, according to at least one embodiment of the disclosure.

FIG. 7 is a flow chart illustrating an exemplary implementation of a feature toggle management process 700 with application behavior point-in-time restoration using event sourcing, according to at least one embodiment of the disclosure. A shown in FIG. 7, the exemplary feature toggle management process 700 maintains a plurality of feature toggle events for a plurality of features of an application during step 702. Each feature toggle event typically comprises an indication of an event time of the respective feature toggle event for a given feature.

During step 704, the exemplary feature toggle management process 700 receives a request to execute the application with feature toggle settings associated with an indicated point-in-time. The feature toggle management process 700 then initiates an execution of the application during step 706 with the feature toggle settings associated with the indicated point-in-time by processing the feature toggle events having an event time up to the indicated point-in-time.

One or more embodiments of the disclosed techniques for feature toggle management with application behavior point-in-time restoration allow developers to return the application to a specific point-in-time, facilitating easier root cause identification and faster resolution of transient issues.

For example, consider a customer that reported that they have not received an update regarding a purchase order they submitted on a given Tuesday. The issue can be observed by looking at the database, but when an attempt is made to re-submit the purchase order, the error cannot be reproduced. The disclosed techniques for feature toggle management with application behavior point-in-time restoration can be configured to only return the feature toggle configuration that was set at the time the customer submitted the purchase order on the given Tuesday. Using the disclosed tools, the exact application execution path at the indicated point-in-time can be reconstituted in at least some embodiments.

The particular processing operations and other network functionality described in conjunction with the flow diagrams of FIGS. 5, 6A, 6B and 7 are presented by way of illustrative example only, and should not be construed as limiting the scope of the disclosure in any way. Alternative embodiments can use other types of processing operations to manage feature toggles using the disclosed application behavior point-in-time restoration. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In some embodiments, the disclosed feature toggle management techniques allow the feature toggles of an application to be restored to the feature toggle settings of an indicated point-in-time.

One or more embodiments of the disclosure provide improved methods, apparatus and computer program products for feature toggle management with application behavior point-in-time restoration using event sourcing. The foregoing applications and associated embodiments should be considered as illustrative only, and numerous other embodiments can be configured using the techniques disclosed herein, in a wide variety of different applications.

It should also be understood that the disclosed feature toggle management techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for feature toggle management with application behavior point-in-time restoration using event sourcing may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based feature toggle management engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based feature toggle management platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
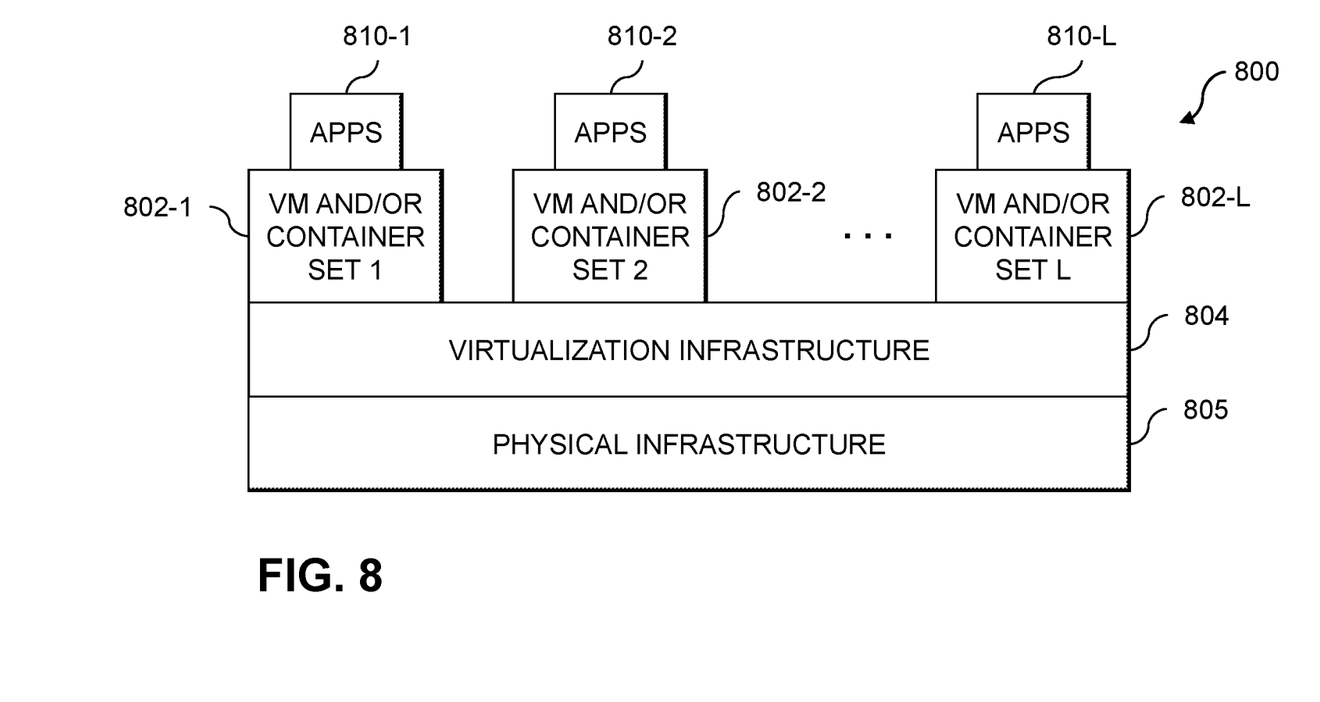
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide feature toggle management functionality of the type described above for one or more processes running on a given one of the VMs. For example, each of the VMs can implement feature toggle management control logic and associated feature event repositories for restoring an application to an indicated point-in-time for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide feature toggle management functionality of the type described above for one or more processes running on different ones of the containers. For example, a container host device supporting multiple containers of one or more container sets can implement one or more instances of feature toggle management control logic and associated feature event repositories for restoring an application to an indicated point-in-time.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
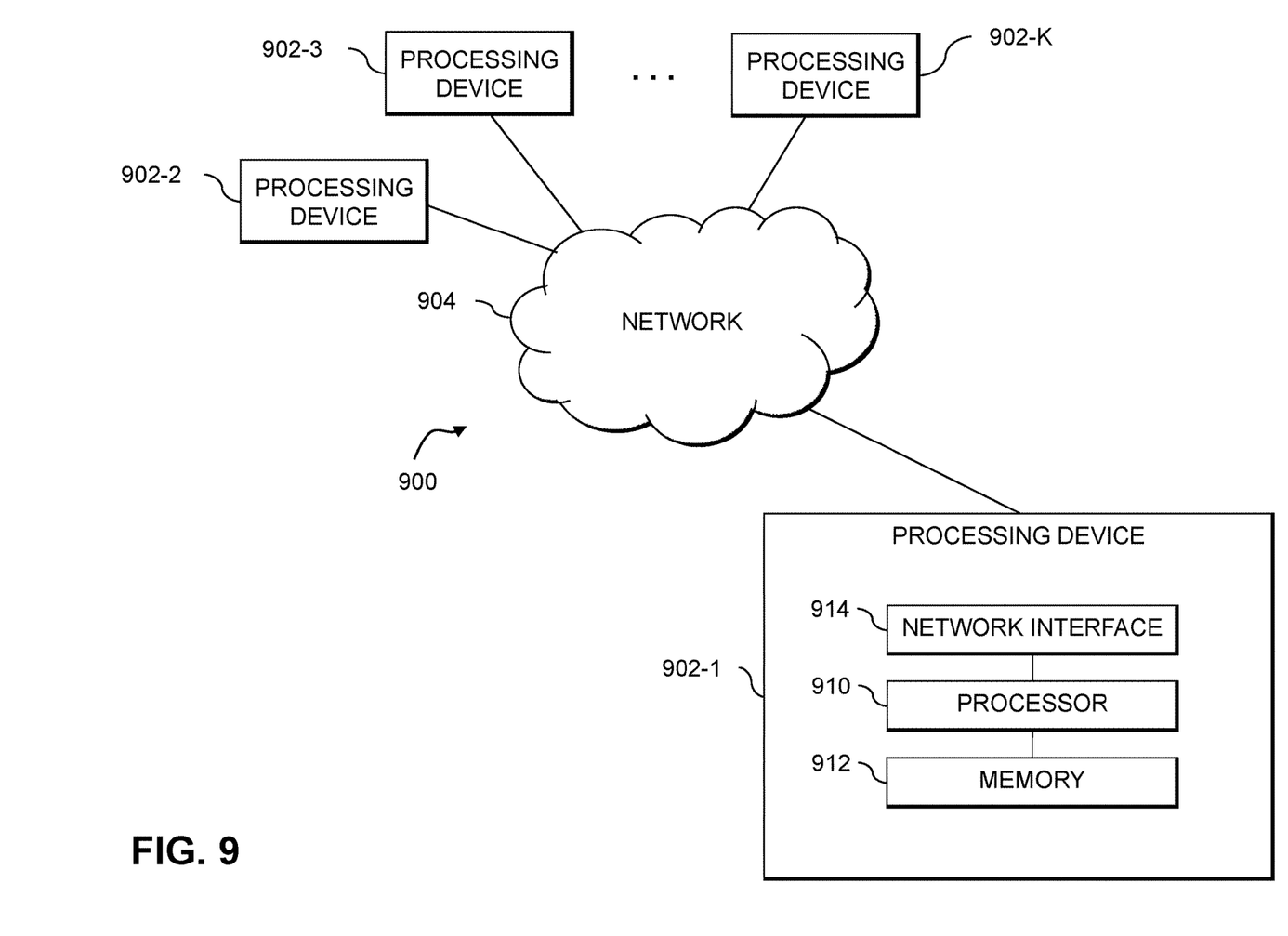
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
maintaining a plurality of feature toggle events for a plurality of features of an application, wherein a given feature is toggled between a plurality of feature states and wherein each feature toggle event for the given feature (i) is generated in response to a change in a feature state of the given feature and (ii) comprises: an indication of an event time of the respective feature toggle event and an indication of a particular feature state for the given feature;
receiving a request to execute the application with feature toggle settings associated with an indicated point-in-time; and
initiating an execution of the application with the feature toggle settings associated with the indicated point-in-time by processing the plurality of feature toggle events of the application having an event time before and up to the indicated point-in-time,
wherein the method is performed by at least one processing device comprising a processor coupled to a memory.

2. The method of claim 1, wherein the maintaining employs event sourcing to store the plurality of feature toggle events for the plurality of features in an event repository.

3. The method of claim 1, wherein the initiating the execution of the application comprises the application consuming the feature toggle events having an event time up to the indicated point-in-time to restore the application with the feature toggle settings for the indicated point-in-time.

4. The method of claim 1, wherein the initiating the execution of the application comprises the application ignoring the feature toggle events having an event time after the indicated point-in-time.

5. The method of claim 1, wherein the maintaining further comprises maintaining an in-memory representation of a most recent setting for each feature, and wherein the in-memory representation is interrogated by the application to one or more of: (i) determine the setting of a given feature and (ii) restart the application.

6. The method of claim 1, wherein the processing the feature toggle events having the event time up to the indicated point-in-time further comprises processing the plurality of feature toggle events for the plurality of features of the application in time order up to the indicated point-in-time.

7. The method of claim 1, wherein the processing the feature toggle events having the event time up to the indicated point-in-time further comprises updating each feature indicated for each processed feature toggle event using a feature toggle value indicated by each processed feature toggle event.

8. An apparatus comprising:
at least one processing device comprising a processor coupled to a memory;
the at least one processing device being configured to implement the following steps:
maintaining a plurality of feature toggle events for a plurality of features of an application, wherein a given feature is toggled between a plurality of feature states and wherein each feature toggle event for the given feature (i) is generated in response to a change in a feature state of the given feature and (ii) comprises: an indication of an event time of the respective feature toggle event and an indication of a particular feature state for the given feature;
receiving a request to execute the application with feature toggle settings associated with an indicated point-in-time; and
initiating an execution of the application with the feature toggle settings associated with the indicated point-in-time by processing the plurality of feature toggle events of the application having an event time before and up to the indicated point-in-time.

9. The apparatus of claim 8, wherein the maintaining employs event sourcing to store the plurality of feature toggle events for the plurality of features in an event repository.

10. The apparatus of claim 8, wherein the initiating the execution of the application comprises the application consuming the feature toggle events having an event time up to the indicated point-in-time to restore the application with the feature toggle settings for the indicated point-in-time.

11. The apparatus of claim 8, wherein the initiating the execution of the application comprises the application ignoring the feature toggle events having an event time after the indicated point-in-time.

12. The apparatus of claim 8, wherein the maintaining further comprises maintaining an in-memory representation of a most recent setting for each feature, and wherein the in-memory representation is interrogated by the application to one or more of: (i) determine the setting of a given feature and (ii) restart the application.

13. The apparatus of claim 8, wherein the processing the feature toggle events having the event time up to the indicated point-in-time further comprises processing the plurality of feature toggle events for the plurality of features of the application in time order up to the indicated point-in-time.

14. A non-transitory processor-readable storage medium having stored therein program code of one or more software programs, wherein the program code when executed by at least one processing device causes the at least one processing device to perform the following steps:
  maintaining a plurality of feature toggle events for a plurality of features of an application, wherein a given feature is toggled between a plurality of feature states and wherein each feature toggle event for the given feature (i) is generated in response to a change in a feature state of the given feature and (ii) comprises: an indication of an event time of the respective feature toggle event and an indication of a particular feature state for the given feature;
  receiving a request to execute the application with feature toggle settings associated with an indicated point-in-time; and
  initiating an execution of the application with the feature toggle settings associated with the indicated point-in-time by processing the plurality of feature toggle events of the application having an event time before and up to the indicated point-in-time.

15. The non-transitory processor-readable storage medium of claim 14, wherein the maintaining employs event sourcing to store the plurality of feature toggle events for the plurality of features in an event repository.

16. The non-transitory processor-readable storage medium of claim 14, wherein the initiating the execution of the application comprises the application consuming the feature toggle events having an event time up to the indicated point-in-time to restore the application with the feature toggle settings for the indicated point-in-time.

17. The non-transitory processor-readable storage medium of claim 14, wherein the initiating the execution of the application comprises the application ignoring the feature toggle events having an event time after the indicated point-in-time.

18. The non-transitory processor-readable storage medium of claim 14, wherein the maintaining further comprises maintaining an in-memory representation of a most recent setting for each feature, and wherein the in-memory representation is interrogated by the application to one or more of: (i) determine the setting of a given feature and (ii) restart the application.

19. The non-transitory processor-readable storage medium of claim 14, wherein the processing the feature toggle events having the event time up to the indicated point-in-time further comprises processing the plurality of feature toggle events for the plurality of features of the application in time order up to the indicated point-in-time.

20. The method of claim 1, further comprising determining whether a given feature is enabled and executing the given feature in response to determining that the given feature is enabled.

\* \* \* \* \*